United States Patent [19]

Hirasawa

[11] Patent Number: 5,406,069
[45] Date of Patent: Apr. 11, 1995

[54] OPTICAL APPARATUS WITH PLURAL LENSES AND FOCUS ADJUSTMENT

[75] Inventor: Masahide Hirasawa, Kanagawa, Japan

[73] Assignee: Canon Kabushiki Kaisha, Tokyo, Japan

[21] Appl. No.: 133,432

[22] Filed: Oct. 4, 1993

Related U.S. Application Data

[63] Continuation of Ser. No. 998,619, Dec. 30, 1992, Pat. No. 5,276,318.

[30] Foreign Application Priority Data

Jan. 10, 1992 [JP] Japan .................................. 4-003005

[51] Int. Cl.[6] .............................................. G01J 1/20
[52] U.S. Cl. ................................ 250/201.4; 250/201.7
[58] Field of Search ................. 250/216, 201.2, 201.3, 250/201.4, 201.5, 201.6, 201.7, 201.8; 354/206, 207, 208

[56] References Cited

U.S. PATENT DOCUMENTS

4,912,496 3/1990 Tamada et al. ................. 250/201.4

Primary Examiner—David C. Nelms
Attorney, Agent, or Firm—Robin, Blecker, Daley & Driscoll

[57] ABSTRACT

An optical apparatus includes a first motor arranged to vary a magnifying power, a second motor arranged to make compensation when the first lens moves and also to adjust focus, a first motor arranged to move the first lens in the direction of an optical axis, a stepping motor being arranged as the first motor, a second motor arranged to move the second lens in the direction of the optical axis, a detecting part arranged to detect the position of the first lens on the basis of the number of driving pulse steps of the first motor, a memory circuit arranged to store information on adequate second lens moving positions in relation to specific moving positions of the first lens, and a control circuit arranged to control a driving action of the second motor on the basis of information, on the position of the first lens detected by the detecting part and the information on the adequate moving position of the second lens.

11 Claims, 5 Drawing Sheets

OPTICAL APPARATUS WITH PLURAL LENSES AND FOCUS ADJUSTMENT

This application is a continuation of application Ser. No. 998,619, filed Dec. 30, 1992, now U.S. Pat. No. 5,276,318.

BACKGROUND OF THE INVENTION

1. Field of the Invention

This invention relates to an optical apparatus arranged to control an inner focus type lens system.

2Description of the Related Art

It is known that an inner focus type lens system includes a focusing-compensator lens which is arranged in the rear of a variator lens on its optical axis to serve both as a compensator lens and a focusing lens. Therefore, the position of the focusing-compensator lens at which an in-focus state is obtainable on an image pickup plane varies with a distance to a picture-taken object even if the focal length of the optical system is kept constant.

Figure 2:
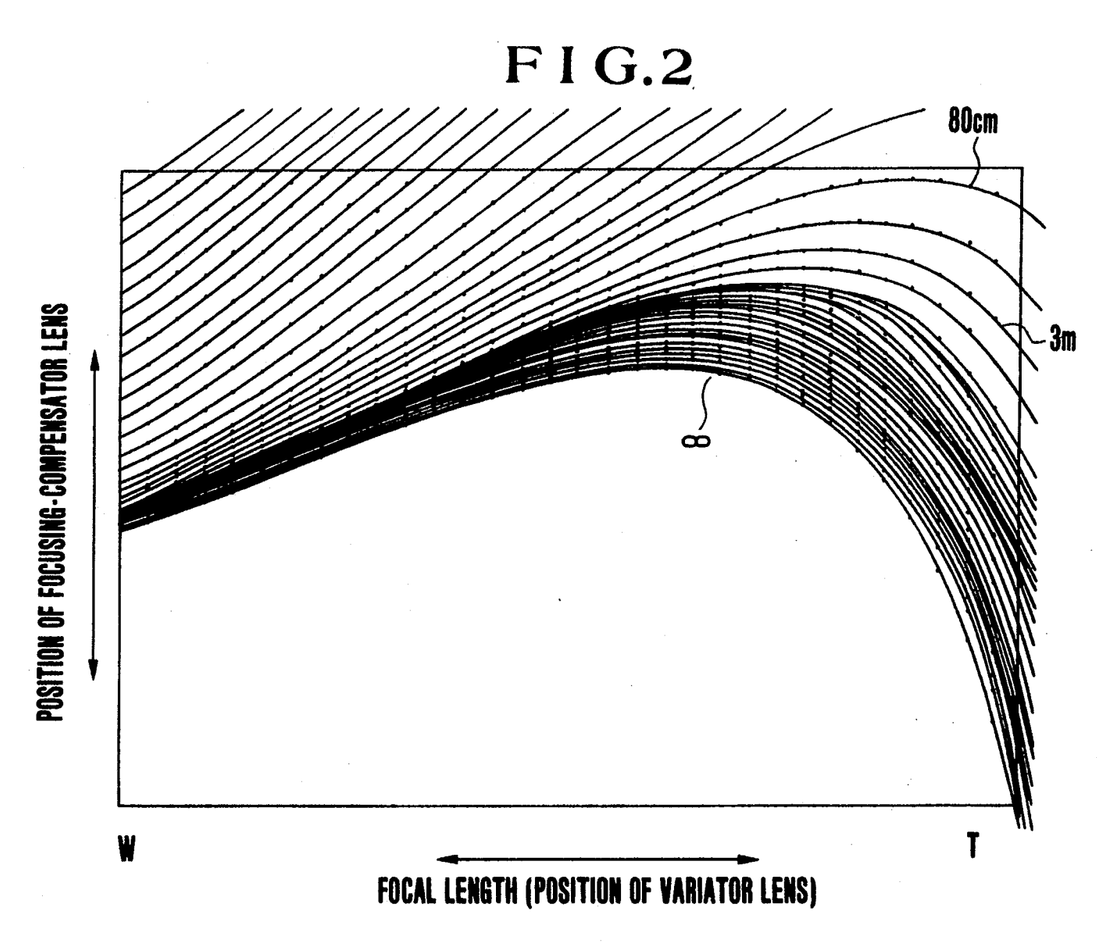
FIG. 2 is a graph showing a relationship between the position of a variator lens and that of a focusing-compensator lens necessary for maintaining an in-focus state at each of various focal lengths.

When the object distance is changed at each of different focal lengths, the position of the focusing-compensator lens for obtaining an in-focus state on the image pickup plane varies as indicated by points continuously plotted in FIG. 2. A zooming operation can be carried out without any blur by selecting a specific locus from among a plurality of loci shown in FIG. 2 according to the object distance and by moving, during zooming, the focusing-compensator lens according to the specific locus.

Meanwhile, in the case of a front-lens focus type lens system, a compensator lens is arranged independently of a variator lens. Further, the variator lens and the compensator lens are connected to each other by a mechanical cam ring. Therefore, if, for example, a manual zooming operation ring is provided on the cam ring for manually varying the focal length, the cam ring follows the operation ring to enable the variator and compensator lenses to move along the cam groove of the cam ring, no matter how fast the operation ring is moved. Therefore, no blur will be caused by the movement of the operation ring as long as the focusing lens is in an in-focus position.

With respect to the control over the inner focus type lens system which has the characteristic mentioned above, it is generally practiced to have information on the plurality of loci shown in FIG. 2 stored in a suitable form in a lens control microcomputer, to select one of the loci according to the position of the focusing-compensator lens and that of the variator lens, and to perform zooming while tracing the locus selected.

According to the conventional practice, however, a moving speed of the focusing-compensator lens and a point to which the focusing-compensator lens is to be moved are determined according to the position of the variator lens. Therefore, the conventional practice has the following drawbacks:

(1) If the position of the variator lens is not accurately detected within a given allowable error range, it is hardly possible to correctly read out the locus data corresponding to the actual position of the variator lens. The inaccurate detection of the position of the variator lens degrades the accuracy of focusing to be carried on during the process of zooming. Therefore, it is necessary to use a highly accurate detector for the detection of the position of the variator lens. However, the use of an accurate detector results in a cost increase.

As apparent from FIG. 2, the locus data gradually approaches to a shape perpendicular to the abscissa axis near a telephoto end position of the variator lens. It is known that this tendency becomes more salient accordingly as the magnifying rate of the variator lens is higher. In order to accurately store the locus data for positions near the telephoto end, therefore, the position detecting accuracy for the variator lens must be increased for a greater magnifying power of the lens system.

(2). Since the focusing-compensator lens must be smoothly moved according to the movement of the variator lens, the moving speed of the variator lens must be kept constant. In cases where a DC motor is used for driving the variator lens like the conventional arrangement, it is necessary for this purpose to apply servo-control to the driving action of the DC motor or to finely adjust the movement of the focusing-compensator lens by relatively accurately detecting the fluctuations in the moving speed of the variator lens during zooming.

The necessity of the servo-control and the detection of fluctuations in the moving speed not only imposes restrictions on design but also directly causes increases in the number of parts and in the load of microcomputer programs.

SUMMARY OF THE INVENTION

One aspect of this invention resides in the provision of an optical apparatus which is of the kind using and controlling an inner focus type lens system, wherein a stepping motor which performs a stepping action is used as a drive source for a variator lens, the position of the variator lens is detected from the number of driving steps of the motor, a plurality of specific positions of the variator lens preset for respective focal lengths of the lens system are detected, and the movement of a focusing-compensaror lens for the plurality of specific positions is controlled on the basis of information obtained from memory means, so that the focusing-compensator lens can be accurately moved.

The above and other aspects and features of the invention will become apparent from the following detailed description of an embodiment thereof taken in connection with the accompanying drawings.

DETAILED DESCRIPTION OF THE PREFERRED EMBODIMENT

Figure 1:
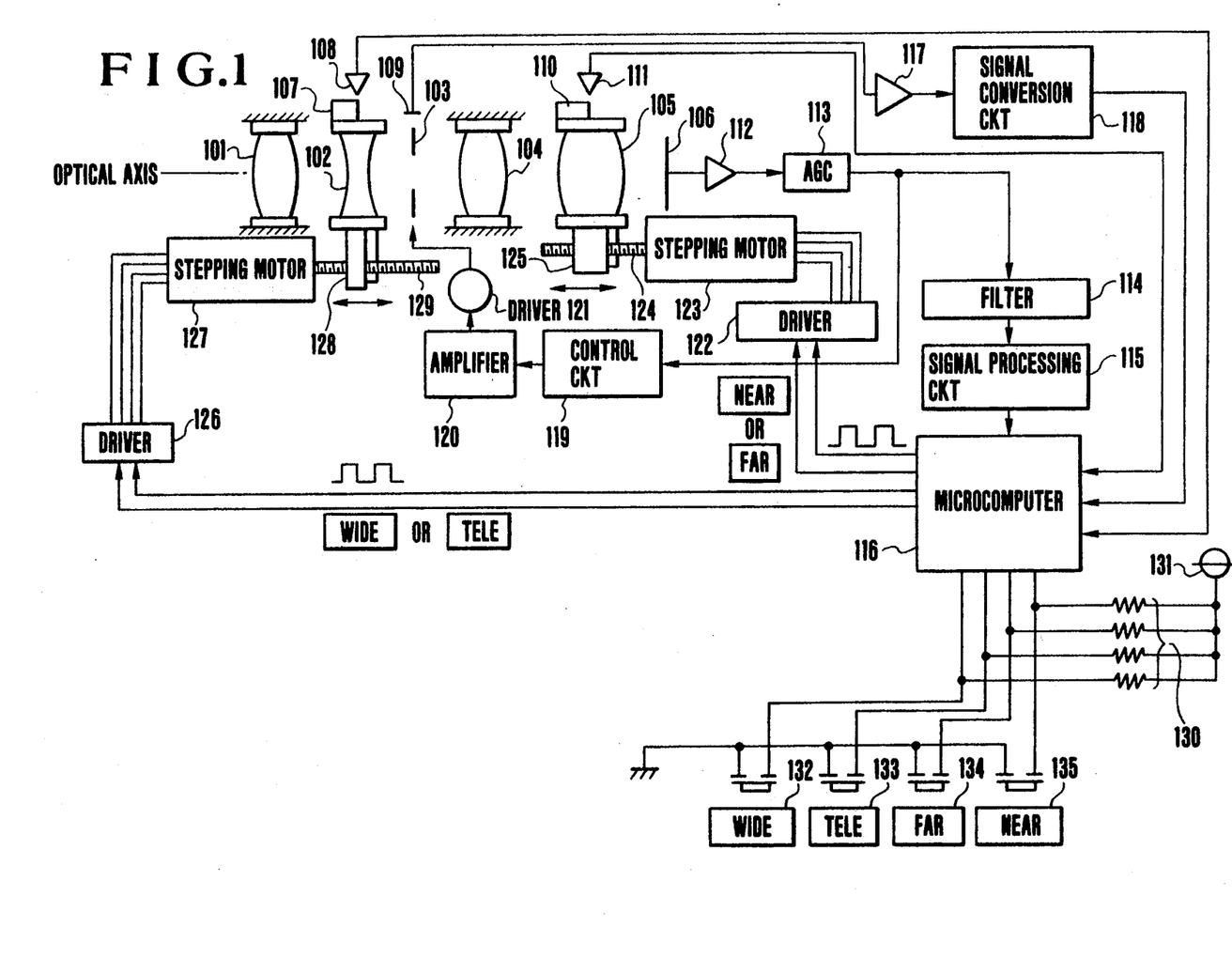
FIG. 1 is a diagram showing the arrangement of an optical apparatus as an embodiment of this invention.

FIG. 1 shows the arrangement of an optical apparatus as an embodiment of this invention. Referring to FIG. 1, an inner focus type lens system is composed of elements 101, 102, 103, 104 and 105. These elements include a fixed front lens group 101, a second lens group 102 for varying a magnifying power, a diaphragm 103, a third lens group 104 which is fixed, and a fourth lens group 105 which has both a focusing function and a function of making compensation when the magnifying power varies. Switches 107 and 110 are provided respectively for detecting that the second lens group 102 and the fourth lens group 105 are in their respective reference positions. In the case of FIG. 1, these switches 107 and 110 are respectively disposed at these lens groups together with photo-sensors 108 and 111. The switch 107 is secured to the second lens group 102 and the switch 110 is secured to the fourth lens group 105. The switches 107 and 110 are thus arranged to move in parallel to the optical axis as the lens groups 102 and 105 move in parallel to the optical axis, and to selectively act to block or not to block the light outputs of the photosensors 108 and 111 with the middle parts of the movable range of these lens groups taken in the respective boundaries. The light detecting part of each of the photo-sensors 108 and 111 is arranged to output a signal of "1" or a signal or "0" according to whether the light output is blocked or not blocked. A point at which the signal output of each of the light detecting parts changes is considered to be the reference position. Therefore, whether the lens groups 102 and 105 are in the above-stated reference positions or not can be determined on the basis of these points. The apparatus is provided with an image sensor 106, an encoder 109 for detecting the aperture position of the diaphragm 103, an amplifier or an impedance converter 112, a known AGC (automatic gain control circuit) 113, a filter 114 for extracting only a high-frequency component of a video signal, a signal processing circuit 115 which is arranged to process the video signal for AF (automatic focusing), a microcomputer 116 for driving control over the lens system, an amplifier 117 for amplifying the output signal of the encoder 109, a signal conversion circuit 118 arranged to convert the output signal of the amplifier 117 into a signal readable by the microcomputer 116, a control circuit 119 arranged to detect the level of the output signal of the AGC 113 and to adjust the aperture position of the diaphragm 103 in such a way as to keep the level constant, an amplifier 120 for amplifying the output of the control circuit 119, a driver 121 for driving the diaphragm 103, drivers 126 and 122 for applying driving energy to stepping motors 127 and 123 according to instructions given from the microcomputer 116 for driving the second and fourth lens groups 102 and 105, the stepping motors 123 and 127, output gear shafts 124 and 129 which are connected directly to the stepping motors 123 and 127, racks 125 and 128 arranged for the output gear shafts 124 and 129 respectively to move the lens groups 105 and 102 which are secured to them by moving in parallel to the optical axis when the output gear shafts 124 and 129 are rotated, a pull-up resistor group 130, a power supply 131, switches 132 and 133 for moving the second lens group 102 toward a wide-angle end and toward a telephoto end, respectively, and switches 134 and 135 for moving the fourth lens group 105 respectively toward an infinity distance position and toward a nearest distance position.

With the inner focus type lens system arranged as shown in FIG. 1, when a magnifying power varying action is performed by moving the second lens group 102, the in-focus positions of the fourth lens group 105 obtained at various focal lengths give the loci as shown in FIG. 2. In other words, in order that a power varying action is to be performed while keeping an in-focus state, information about the loci shown in FIG. 2 is stored in some suitable form (either in the form of loci or in the form of functions with the lens positions used as variables) in a memory (ROM) provided within the microcomputer 116, the locus information thus stored is read out according to the position or a moving speed of the variator lens (the second lens group 102), and the focusing-compensator lens (the fourth lens group 105) is moved in accordance with the locus information read out.

Figure 3:
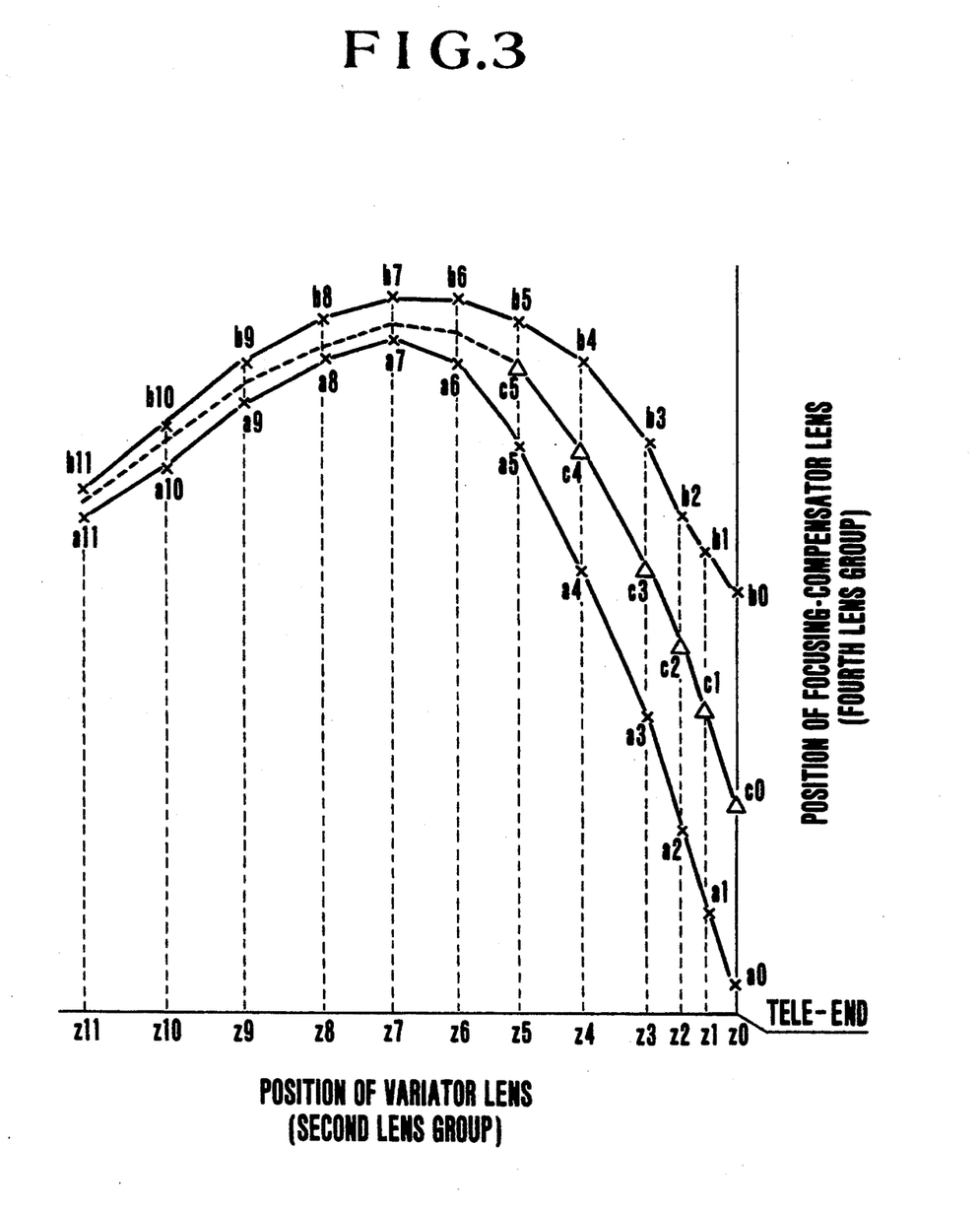
FIG. 3 is a graph showing the locus tracing method in the embodiment.

FIG. 3 shows, by way of example, a method for tracing the above-stated loci in accordance with this invention. Referring to FIG. 3, a series of points a0, a1, a2, —all and another series of points b0, b1, b2, . . . b11 obtained respectively at a plurality of specific positions z0, z1, z2, . . . z11 of the variator lens 102 indicate the representative loci stored within the microcomputer 116. Further, a series of points c0, c1, c2, . . . c11 show a locus obtained by computation on the basis of the above-stated two loci. The computing operation is performed in accordance with the following formula:

$$c(n+1) = |c(n) - a(n)|/|b(n) - a(n)| * |b(n+1) - a(n+1)| + a(n+1) \quad (1)$$

According to the formula (1), in a case where the focusing-compensator lens is located at the point c0 in FIG. 3, for example, a ratio in which a line segment b0 - a0 is internally divided by the point c0 is obtained, and then, a point at which another line segment b1 - a1 is internally divided in accordance with the ratio thus obtained is considered to be the point c1.

This embodiment is arranged on the premise that the formula (1) is to be used. Information on the loci thus must be stored in such a manner that all the loci shown in FIG. 2 are obtainable by using the formula (1).

Figure 4:
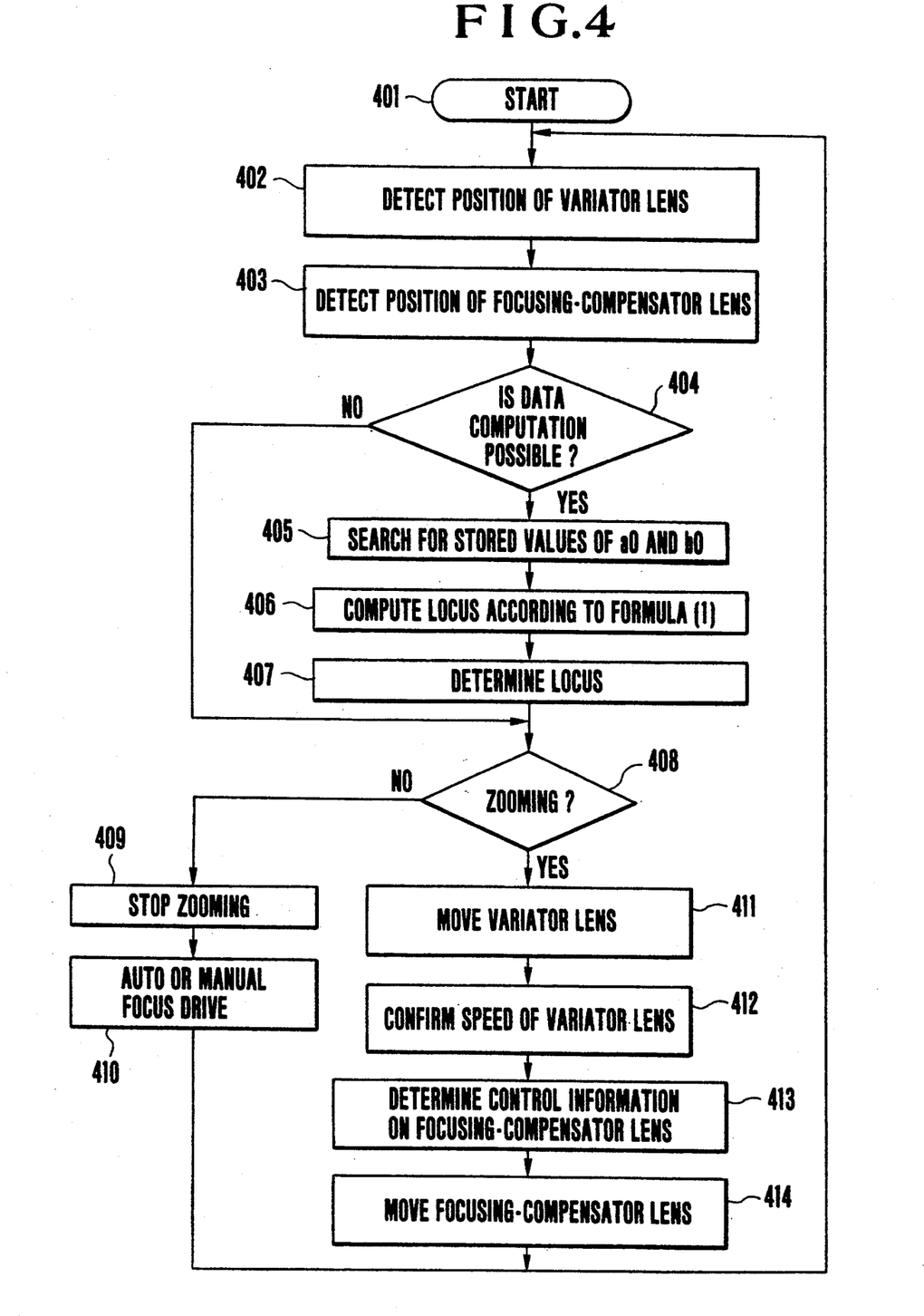
FIG. 4 is a flow chart showing the operation of a microcomputer shown in FIG. 1.

FIG. 4 is a flow chart showing a flow of a program provided within the microcomputer 116 for the purpose of tracing a locus obtained in the above-stated manner. Referring to FIG. 4, the program is as follows:

When the execution of the program begins at a step 401, the position of the variator lens (the second lens group 102) and that of the focusing-compensator lens (the fourth lens group 105) are detected respectively at steps 402 and 403. In the case of this embodiment, the stepping motors 127 and 123 are employed as actuators for these lenses. Therefore, the positions of these lenses 102 and 105 are detectable solely by means of the lens controlling microcomputer 116. More specifically, the stepping pulses required for moving these lenses 102 and 105 are generated at the microcomputer 116. When the pulses are generated at the microcomputer 116, a counter disposed within the microcomputer 116 is reset at the reference position mentioned in the foregoing. Therefore, the positions of these lenses can be detected from the increment and decrement of the count value of the counter. Further, information about the plurality of specific positions z0 to z11 of course can be detected also from the count value of the counter.

At a step 404, after the absolute positions in the direction of the optical axis of the lenses 102 and 105 have been detected in the manner mentioned above, a check is made to find if a computing operation can be carried out according to the formula (1). The computing operation according to the formula (1) is possible only when the variator lens (the second lens group 102) is located in one of the specific positions $z0, z1, z2$,—shown in FIG. 3. Therefore, at the step 404, the check is made to find if the variator lens is in one of these specific positions. If so, the flow of the program comes to a step 405. At the step 405, two stored values of the points $a0$ and $b0$ located above and below the point $c0$ at which the focusing-compensator lens (the fourth lens group 105) is located are searched for from the memory. At a step 406, the value of the point $c1$ is computed according to the formula (1). At a step 407, the movement locus of the focusing-compensating lens (the fourth lens group 105) resulting from variations of the magnifying power is determined according to the computed value of the point $c1$. Further, this locus computation can be serially carried out for segments between the points $c0$ and $c1$, $c1$ and $c2$, $c3$ and $c4$, $c4$ and $c5$,.... Therefore, a locus ranging from the telephoto end position over to the wide-angle end position can be obtained at once even when the variator lens is in the telephoto end position by repeating the computing operation at the steps 406 and 407. It is also possible to compute one segment of the locus at a time by each round of the flow of the program.

If the data computation is found to be impossible at the step 404, the flow comes to a step 408 by, for example, using a previously computed locus without newly performing the locus computation. At the step 408, a check is made to find if either the switch 132 or the switch 133 has been pushed. If not, the movement of the variator lens (the second lens group 102) is caused to stop at a step 409. At a step 410, an automatic focusing or a manual focusing associated with the operating state of the switch 134 or 135 is effected.

If either of the switches 132 and 133 is found to be pushed at the step 408, the flow comes to a step 411 to move the variator lens 102 according to the state of the switch 132 or 133. Zooming can be accomplished without any blur, correctly tracing the locus, by moving the focusing-compensator lens 105 (the fourth lens group) from a point $c0$ to a point $c1$ when the variator lens 102 comes from its position $z0$ to another position $z1$. Therefore, it is necessary to predict the time of arrival of the variator lens at the position $z1$. The use of the stepping motor 127 as an actuator for the variator lens 102 enables the lens controlling microcomputer 116 to accurately predict (or adjust) the arrival time and to move the variator lens 102 accurately to the desired position. Therefore, at a step 412, the time of arrival of the variator lens 102 at the position $z1$ is confirmed. At a step 413, by using a method which will be described by way of example later herein, control information about the moving speed and the moving time for the focusing-compensator lens 105 is determined. At a step 414, the focusing-compensator lens 105 is moved according to control information determined at the step 413.

Figure 5:
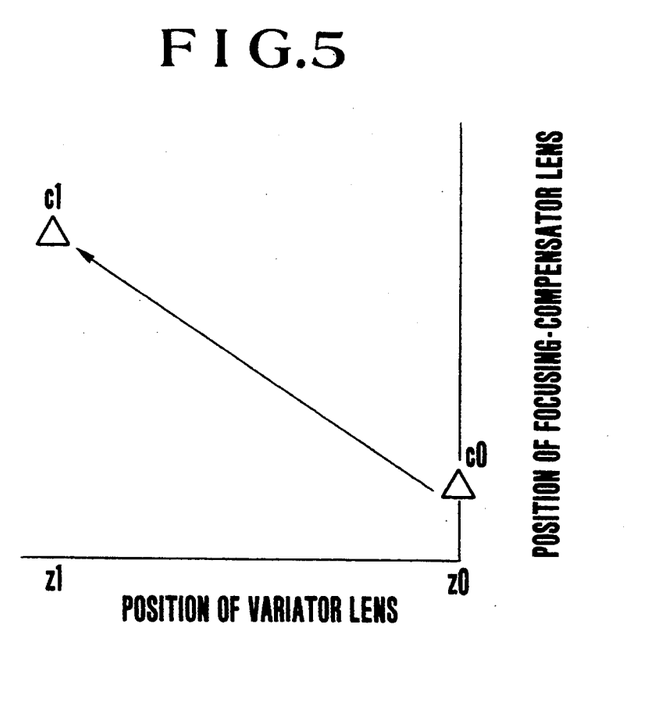
FIG. 5 is a graph showing a method for moving the focusing-compensator lens following the movement of the variator lens.
Figure 6:
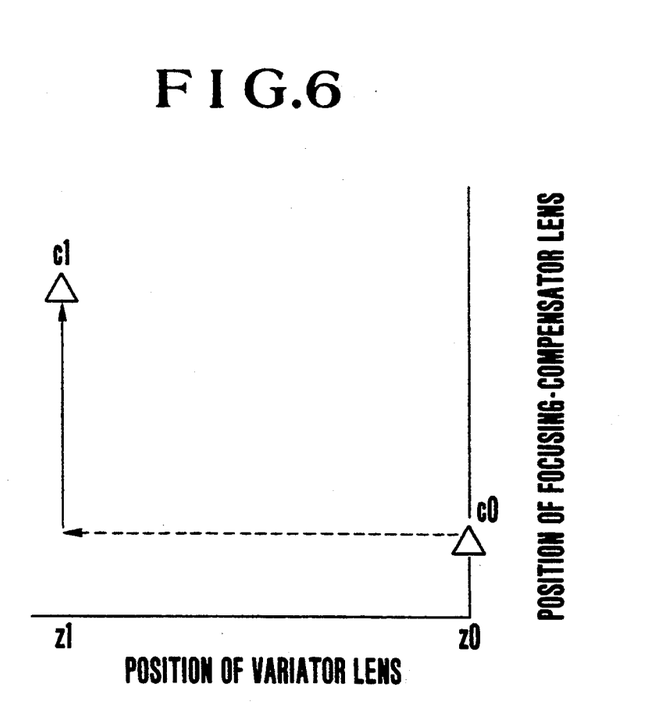
FIG. 6 is a graph showing another method for moving the focusing-compensator lens following the movement of the variator lens.

A method for determining the control information for the focusing-compensator lens 105 at the step 413 is described by way of example as follows: FIGS. 5 and 6 show methods for moving the focusing-compensator lens 105 when the variator lens 102 is moved from its position $z0$ to its position $z1$ with the points $c0$ and $c1$ determined.

In the case of FIG. 5, a speed at which the focusing-compensator lens 105 is to be moved from the point $c0$ to the point $c1$ is computed from the time required for moving the variator lens 102 from the position $z0$ to the position $z1$. The focusing-compensator lens 105 is then moved at the computed speed following the movement of the variator lens 102.

According to a method shown in FIG. 6, the focusing-variator lens 105 is moved at a high speed from the point $c0$ to the point $c1$ at a time after arrival of the variator lens 102 at the position $z1$.

Further, as shown in FIG. 3, the plurality of specific positions $z0, z1, z2, z3, \ldots z11$ of the variator lens 102 which are set for controlling the movement of the focusing-compensator lens 105 are not evenly spaced. The spacing distance varies according to the focal length, because the movement locus of the focusing-compensator lens 105, as shown in FIGS. 2 and 3, has a steeper inclination on the telephoto side than other parts. It is thus deemed to be necessary to have more accurate control on the telephoto side. The movement of the focusing-compensator lens 105 can be accurately controlled by arranging the spacing distance between the specific positions of the variator lens to be shorter for the focal length area where the movement locus of the focusing-compensator lens 105 has a steeper inclination.

As described in the foregoing, the embodiment is arranged to use a stepping motor as an actuator for the variator lens of an inner focus type lens system and to obtain a plurality of specific positions of the variator lens. This arrangement enables the embodiment to highly accurately control the position and the moving speed of the variator lens. Spacing distances among the specific positions are differentiated one from another according to the focal length. Therefore, the movement locus set for the focusing-compensator lens can be accurately traced during zooming even if the magnifying power varying rate of zooming is high. The arrangement of the embodiment thus enhances the accuracy of focusing to be carried on during the zooming operation.

What is claimed is:
1. An optical apparatus comprising:
   a) a first lens arranged to perform a magnifying power varying action;
   b) a second lens arranged to both make compensation at the time of a movement of said first lens and adjust a focus of said optical apparatus;
   c) a first motor for moving said first lens in the direction of an optical axis of said optical apparatus;
   d) a second motor for moving said second lens in the direction of the optical axis;
   e) detecting means for detecting a position of said first lens;
   f) a memory circuit for storing each moving position of said second lens based on each moving position of said first lens, said memory circuit being arranged to store each adequate moving position of said second lens corresponding to each of a plurality of specific positions of said first lens to be detected by said detecting means; and
   g) a control circuit arranged to control a driving action of said second motor on the basis of information on the position of said first lens detected by said detecting means and information on said each moving position of said second lens stored in said memory circuit, said control circuit computing each moving information of said second lens at each position of said first lens which are unequally spaced during the movement of said first lens.

2. An apparatus according to claim 1, wherein said detecting means is arranged to detect said plurality of specific positions and also positions between said plurality of specific positions.

3. An apparatus according to claim 1, wherein said first motor and said second motor each employ a stepping motor.

4. An apparatus according to claim 1, wherein said control circuit is arranged to control the driving action of said second motor by reading out from said memory circuit the information on said adequate moving position of said second lens which is taken when said first lens is in a certain specific position of said plurality of specific positions.

5. An apparatus according to claim 4, wherein said control circuit is arranged to obtain, by computation, a driving speed of said second motor by obtaining a time at which said first lens reaches said certain specific position.

6. An apparatus according to claim 3, wherein said detecting means detects said position of said first lens on the basis of a number of driving pulse steps of said first motor.

7. An apparatus according to claim 3, further comprising second detecting means for detecting the position of said second lens.

8. An apparatus according to claim 7, wherein said control circuit is arranged to control the driving action of said second motor further on the basis of information on the position of said second lens detected by said second detecting means.

9. An apparatus according to claim 8, wherein said control circuit is arranged to control the driving action of said second motor by reading out from said memory circuit the information on said adequate moving position of said second lens which is taken when said first lens is in a certain specific position of said plurality of specific positions.

10. An apparatus according to claim 9, wherein said control circuit is arranged to obtain, by computation, a driving speed of said second motor by obtaining a time at which said first lens reaches said certain specific position.

11. An apparatus according to claim 7, wherein said second detecting means detects said position of said second lens on the basis of a number of driving pulse steps of said second motor.

* * * * *

UNITED STATES PATENT AND TRADEMARK OFFICE
CERTIFICATE OF CORRECTION

PATENT NO. : 5,406,069
DATED : April 11, 1995
INVENTOR(S) : Masahide Hirasawa

It is certified that error appears in the above-indentified patent and that said Letters Patent is hereby corrected as shown below:

Col. 1, line 13. Change "2Description" to -- 2. Description --.

Col. 2, line 42. Change "compensaror" to -- compensator --.

Col. 3, line 6. Change "an,inner" to -- an inner --.

Col. 4, line 32. Change "∫b(N+1-" to -- ∫b(N+1) --.

Col. 4, line 33. Change ")-a" to -- -a --.

Signed and Sealed this

Eleventh Day of July, 1995

Attest:

BRUCE LEHMAN

Attesting Officer

Commissioner of Patents and Trademarks